US010053971B2

(12) United States Patent
Lai et al.

(10) Patent No.: US 10,053,971 B2
(45) Date of Patent: Aug. 21, 2018

(54) METHOD AND APPARATUS FOR DETECTING DOWNHOLE TORSIONAL VIBRATION BASED ON MEASUREMENT OF SURFACE TORQUE

(71) Applicant: Pason Systems Corp., Calgary (CA)

(72) Inventors: Stephen William Lai, Calgary (CA); Christopher Darren Salvador, Calgary (CA); Kenneth Charles Horovatin, Calgary (CA); Timothy Keith Walter, Calgary (CA)

(73) Assignee: Pason Systems Corp., Calgary (CA)

( * ) Notice: Subject to any disclaimer, the term of this patent is extended or adjusted under 35 U.S.C. 154(b) by 247 days.

(21) Appl. No.: 14/853,229

(22) Filed: Sep. 14, 2015

(65) Prior Publication Data
US 2016/0076354 A1 Mar. 17, 2016

Related U.S. Application Data

(60) Provisional application No. 62/050,603, filed on Sep. 15, 2014.

(51) Int. Cl.
*E21B 44/00* (2006.01)
*E21B 47/00* (2012.01)
(Continued)

(52) U.S. Cl.
CPC .............. *E21B 44/00* (2013.01); *E21B 45/00* (2013.01); *E21B 47/0006* (2013.01);
(Continued)

(58) Field of Classification Search
CPC ........... G05B 15/02; E21B 44/00; E21B 7/28; G05D 19/02
See application file for complete search history.

(56) References Cited

U.S. PATENT DOCUMENTS 8,072,367 B1 * 12/2011 Bausov .................. G01R 27/04
342/118
2012/0123757 A1 * 5/2012 Ertas ...................... E21B 45/00
703/2
(Continued)

FOREIGN PATENT DOCUMENTS

WO 2011/017626 A1 2/2011
WO 2011017627 A1 2/2011

OTHER PUBLICATIONS

Kyllingstad et al. 1988. A Study of Slip/Stick Motion on the Bit. SPE Drill Eng 3(4): 369-371.
(Continued)

*Primary Examiner* — Davienne Monbleau
*Assistant Examiner* — Changhyun Yi
(74) *Attorney, Agent, or Firm* — Katten Muchin Rosenman LLP

(57) ABSTRACT

A method for detecting stick-slip in a drillstring includes (a) measuring a parameter that is a function of a torque applied to the drillstring by a top drive system over a selected time period, the measuring being performed by at least one surface sensor that produces measurement data including torque values over a frequency range; (b) filtering out measurement data that has a frequency outside a selected frequency band, the selected frequency band including a resonant frequency of the drillstring; (c) identifying a minimum and a maximum torque value in the filtered measurement data and determining a difference of these two values; (d) determining a surface stick-slip index by dividing the difference of the maximum and minimum torque values by an average torque value over the selected time period; and (e) displaying the surface stick-slip index on a display.

16 Claims, 9 Drawing Sheets

(51) Int. Cl.
*G01L 5/26* (2006.01)
*E21B 45/00* (2006.01)
*G01L 3/10* (2006.01)
*G01L 3/14* (2006.01)
*G01L 5/12* (2006.01)

(52) U.S. Cl.
CPC ............ *G01L 3/108* (2013.01); *G01L 3/1457* (2013.01); *G01L 5/12* (2013.01)

(56) References Cited

U.S. PATENT DOCUMENTS

| | | | |
|---|---|---|---|
| 2012/0170406 A1* | 7/2012 | DiFoggio | E21B 47/1005 367/35 |
| 2013/0257435 A1* | 10/2013 | Smithson | E21B 47/0905 324/338 |

OTHER PUBLICATIONS

Dufeyte, M-P., and Henneuse, H. 1991. Detection and Monitoring of the Stick-Slip Motion: Field Experiments. Paper SPE 21945 presented at the SPE/IADC Drilling Conference, Amsterdam, Mar. 11-14.

Lai et al., Stick-Slip Detection and Friction Factor Testing Using Surface-Based Torque and Tension Measurements, SPE Annual Technical Conference and Exhibition, Amsterdam, Netherlands, Oct. 27-29, 2014.

* cited by examiner

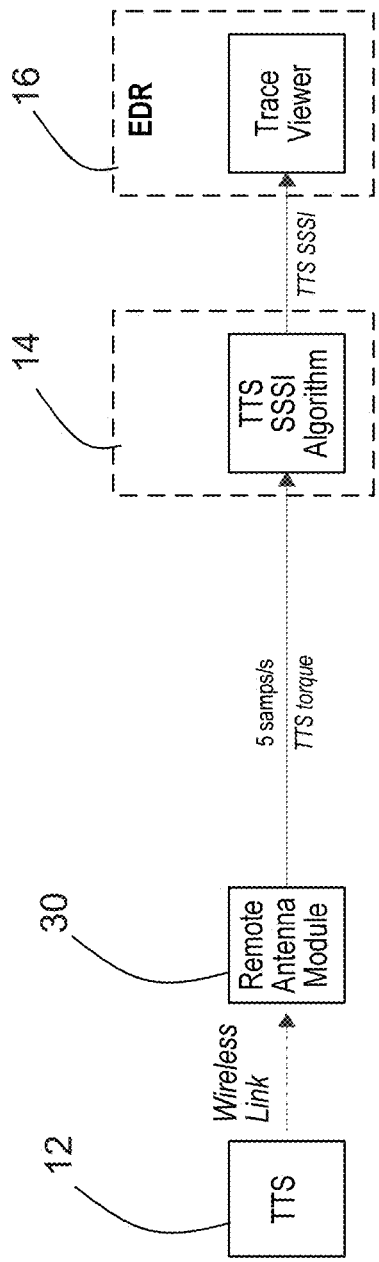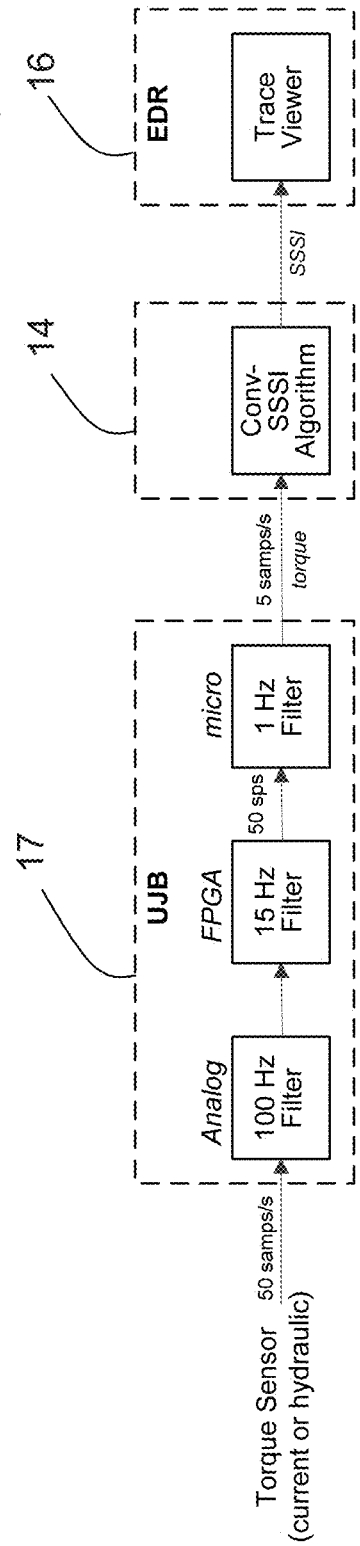
Figure 6(a)
Figure 6(b)

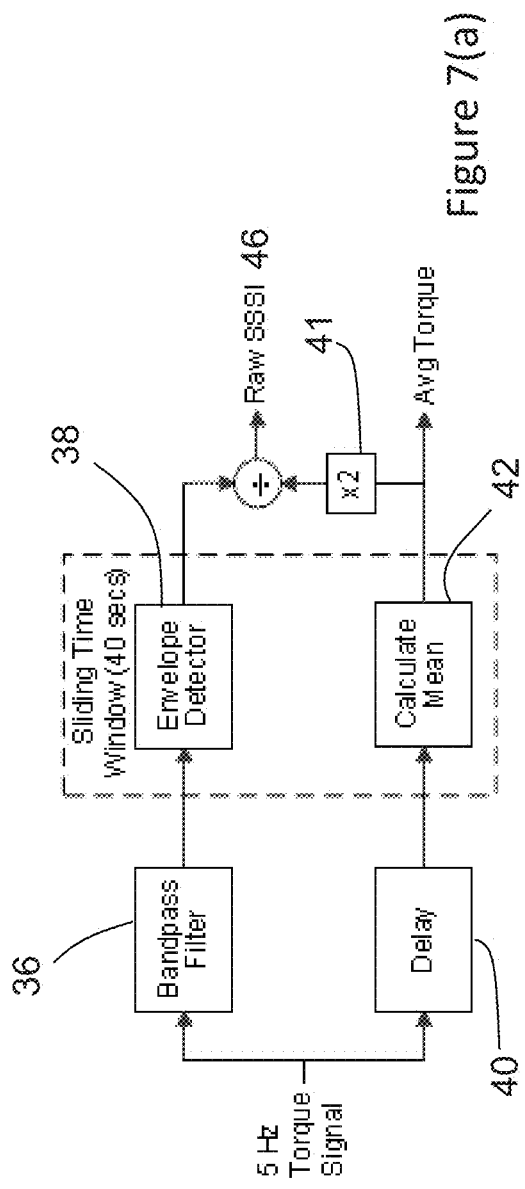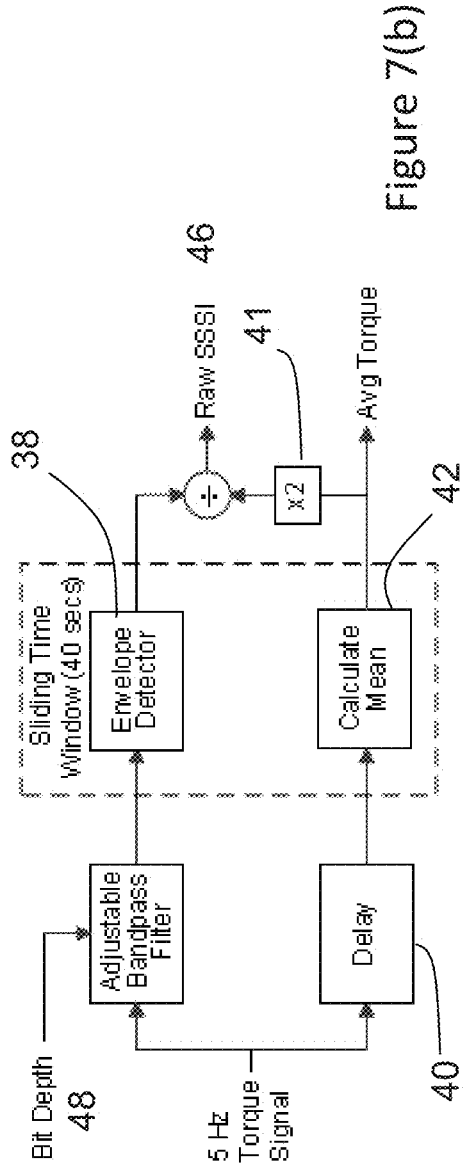
Figure 7(a)
Figure 7(b)

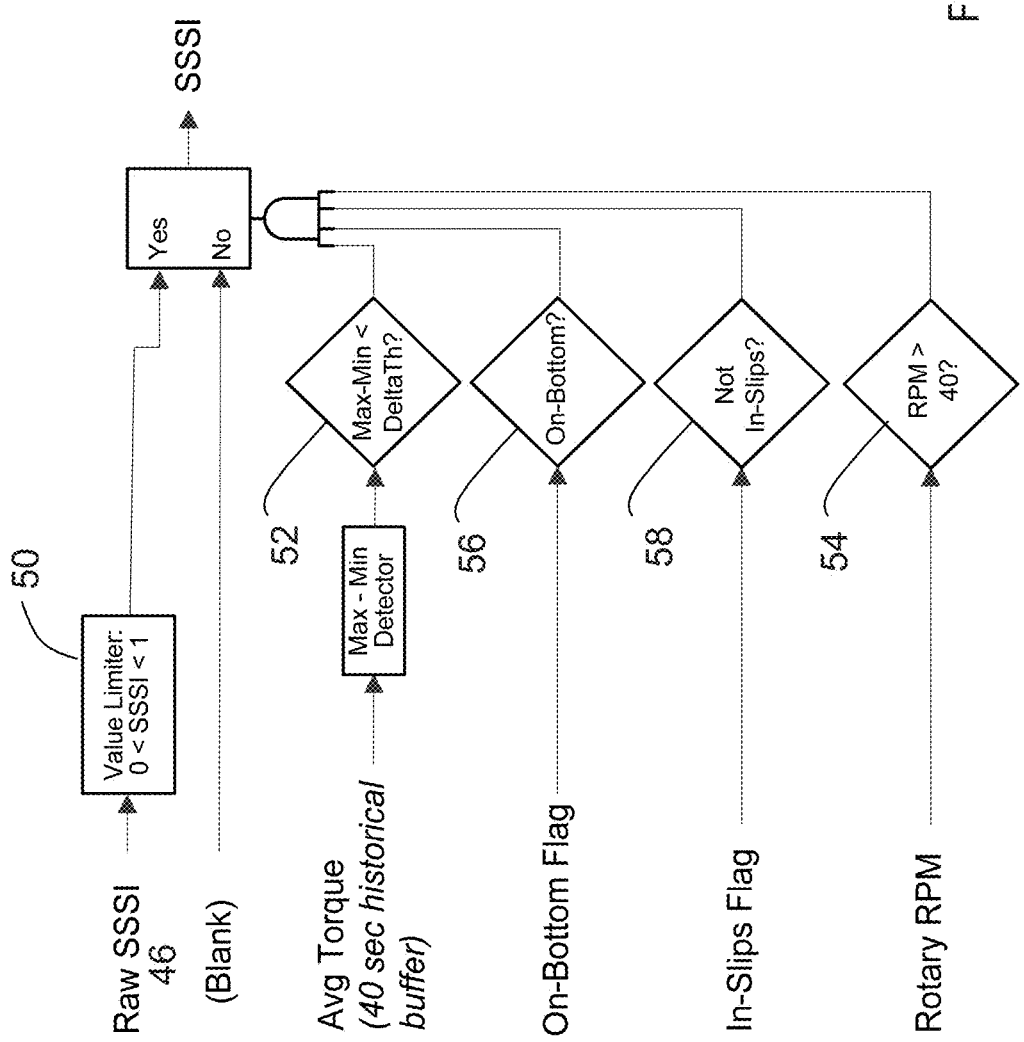

METHOD AND APPARATUS FOR DETECTING DOWNHOLE TORSIONAL VIBRATION BASED ON MEASUREMENT OF SURFACE TORQUE

This application claims priority to U.S. Patent Appln. No. 62/050,603, filed Sep. 15, 2014, which relates generally to a method and apparatus for detecting downhole torsional vibration, commonly referred to as "stick-slip", based on measurement of surface torque, the contents of which are incorporated herein by reference.

FIELD

Background

The drilling industry has seen a dramatic shift in the type of wells it has had to construct. Significant improvements in directional technology and well completion methods have resulted in wellbore profiles that have increasingly complex trajectories and longer horizontal sections. Due to the nature of these wells, a challenge that remains prevalent in most drilling operations is torsional vibration (or "stick-slip").

Stick-slip refers to the large-amplitude torsional vibration that occurs along a drill pipe during drilling. In severe cases, the drill bit starts and stops rotating in a repetitive manner. This behavior is primarily a result of the elastic properties of the steel pipe and frictional interactions between bit-and-rock as well as drillstring-and-wellbore. To analyze stick-slip, the drillstring is often modeled as a torsional spring-damper system where the mechanical reference is a frame that rotates at constant angular velocity (Kyllingstad et al. 1988. A Study of Slip/Stick Motion on the Bit. *SPE Drill Eng* 3(4): 369-373). The severity of stick-slip is directly related to the peak-to-peak variation of angular speed at the bit. When torsional vibration occurs, the bit can rotate at very low and very high speeds but will rotate at the same average speed as the top drive at the surface. The drilling industry has adopted a standard metric to represent the stick-slip severity, which is:

$$DSSI = \frac{\max(RPM) - \min(RPM)}{2 \cdot \text{avg}(RPM)} \quad \text{(equation 1)}$$

where DSSI denotes the downhole stick-slip index and RPM represents angular velocity measured at the bit in revolutions per minute. When stick-slip occurs, the angular velocity as a function of time has a sinewave-like characteristic with an oscillation period that is strongly related to the lowest torsional resonance mode of the drillstring. In many implementations, DSSI is defined over a time interval which exceeds the period of drillstring resonance to capture the maximum and minimum RPM values.

As stick-slip can cause excessive drill bit wear as well as a reduction of drilling efficiency, accurate detection of stick-slip allows a driller to take mitigating actions such as changing drilling parameters or modification of drillstring configuration. The most common known solution for stick-slip detection is to employ measurement tools that are installed at the bottom of the drillstring near the drill bit. These instruments use accelerometers or magnetometers to measure the drill pipe rotation speed. Stick-slip is detected when the rotary speed is observed to increase and decrease quickly in a repetitive manner. Once stick-slip is detected, these tools are designed to notify the driller at the surface by sending an alert or calculating a metric which must be communicated up the wellbore using downhole telemetry methods, such as mud pulse telemetry.

Operating downhole tools to measure stick-slip can be costly and suffer from delays introduced by downhole telemetry. Another known method to measuring stick-slip uses measurements of torque variation as well as a mechanical model of the drillstring configuration to estimate stick-slip severity; see for example PCT publications WO 2011/017626 and WO 2011/017627. This method requires that the properties of the drill pipe and bottom hole assembly ("BHA") be manually entered into an electronic drilling recorder ("EDR"). This information is used create an analytical model of the drillstring. This model is used in conjunction with torque variation measurements to estimate the level of stick-slip. Using this method can be impractical, as detailed mechanical properties of the entire drillstring/BHA are often not compiled in a convenient form at most rig sites. Well planning activities will assume specific drillstring configurations; however, the pipe tally line-up and BHA configuration often deviate from the original plan in order to address unexpected drilling conditions.

Therefore it remains desirable to provide a method that measures slick-slip without the use of a downhole tool, and without requiring a detailed mechanical model of the drillstring configuration.

SUMMARY

According to one aspect of the invention there is provided a method for detecting stick-slip in a drillstring using a surface stick-slip index ("SSSI"). The method comprises the following steps: (a) measuring a parameter that is a function of a torque applied to the drillstring by a top drive system over a selected time period, wherein the measuring is performed by at least one surface sensor that produces measurement data including torque values over a frequency range; (b) filtering out measurement data that has a frequency outside a selected frequency band, wherein the selected frequency band includes a resonant frequency of the drillstring; (c) identifying a minimum and a maximum torque value in the filtered measurement data and determining a difference of these two values; (d) determining the SSSI by dividing the difference of the maximum and minimum torque values by an average torque value over the selected time period; and (e) displaying the SSSI on a display. The average torque value can be normalized such that the SSSI is determined by dividing the difference of the maximum and minimum torque value by a normalized average torque value.

The measured parameter can be strain, in which case the at least one surface sensor comprises a pair of strain gauge sensors in a torque and tension sub coupled to the top drive system. Alternatively, the measured parameter can be electrical current in which case the at least one surface sensor comprises a current sensor in electrical communication with an electric motor of the top drive system. Alternatively, the measured parameter can be pressure, in which case the at least one surface sensor comprises a hydraulic pressure sensor in communication with a hydraulic line of the top drive system. The method can optionally include applying at least one anti-alias filter to reduce spectral aliasing when a signal sample rate is reduced. When multiple anti-alias filters are used, they can be of differing frequencies.

The method can further comprise applying a blanking operation to the determined SSSI before displaying the SSSI. The blanking operation comprises setting the SSSI to null when a rotary speed of the drillstring is less than a selected low speed threshold, or when an average torque over the selected time window varies more than a selected threshold, or when a bit of the drillstring is off-bottom, or when the bit is in-slips.

The step of filtering out measurement data can further comprise determining a bit depth of the drillstring, and dynamically adjusting the selected frequency band according to the determined bit depth.

According to another aspect of the invention, there is provided an apparatus for detecting stick-slip in a drillstring. The apparatus comprises (a) at least one surface sensor; (b) a bandpass filter; (c) a processing unit, and (d) a display. The surface sensor is in sensory communication with a top drive system and is configured to measure a parameter over a selected time period that is a function of torque applied by the top drive system to the drillstring, and to produce measurement data that includes torque values over a frequency range. The bandpass filter is configured to filter out the measurement data that has a frequency outside a selected frequency band, wherein the selected frequency band includes a resonant frequency of the drillstring. The processing unit comprises a processor and a memory having encoded thereon program code that when executed by the processor identifies a minimum and a maximum torque value in the filtered measurement data and determines a difference of these two values; the SSSI is determined by dividing the difference of the maximum and minimum torque values by an average torque value over the selected time period. The display is communicative with the processing unit and is configured to display the SSSI. The bandpass filter can be a hardware filter, or part of the program code stored on the memory.

This summary does not necessarily describe the entire scope of all aspects. Other aspects, features and advantages will be apparent to those of ordinary skill in the art upon review of the following description of specific embodiments.

BRIEF DESCRIPTION OF FIGURES

FIGS. 6(a) and (b) are schematic block diagrams of two embodiments of communications and processing components of the stick-slip detection system, wherein the components shown in FIG. 6(a) receive torque measurements from the torque and tension sub, and the components shown FIG. 6(b) receive torque measurements from electrical current or hydraulic pressure sensors.

FIGS. 7(a) and (b) are logic diagrams showing two embodiments of a method for calculating surface stick-slip indices by the stick-slip detection system.

FIG. 8 is logic diagram showing a blanking logic operation of the method for calculating surface stick-slip indices.

DETAILED DESCRIPTION

Figure 1:
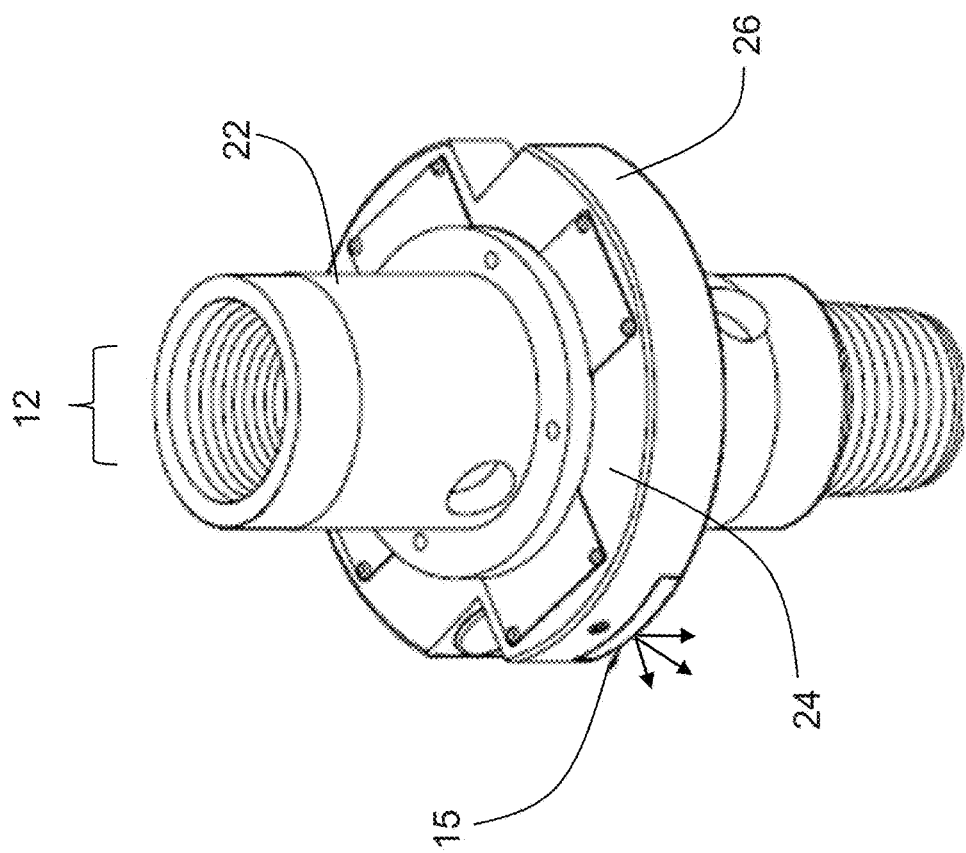
FIG. 1 is a top perspective view of a torque and tension measurement sub of a stick-slip detection system according to an embodiment of the invention.

Directional terms such as "above", "below", "upstring" and "downstring" are used to provide relative reference only and to assist the reader in understanding the embodiments described herein, and are not intended to restrict the orientation of any structure or its use relative to the environment.

Embodiments of the invention described herein relate to a method and a system for detecting the presence of drillstring stick-slip that occurs during drilling of oil and gas wells. The embodiments estimate a level of stick-slip by measuring the variation in torque applied to drill pipe at the surface. In many drilling rigs, torque is applied to rotate the drillstring using a top-drive motor. The motor control system in these top-drive motors is typically designed to achieve a constant rotation rate by applying the necessary level of torque to the drillstring. In certain situations, the frictional interaction between the drilling string and wellbore causes a stick-slip condition. It is known that the stick-slip condition also causes the top-drive motor to apply a sinusoidal variation in top-drive torque. The amplitude of this variation is related the severity of the downhole stick-slip. Stick-slip is detected by filtering the torque signal using a band pass filter to include only relevant frequency components and calculating a metric which is directly related to the amplitude variation observed in the torque signal.

Referring now to FIGS. 1 to 9 and according to one embodiment, a stick-slip detection system 10 generally comprises a torque and tension measurement sub 12 ("TTS", see FIG. 1), a processing unit 14 wirelessly communicative with the TTS 12 via a pair of RF antennas 15, and an electronic drilling recorder 16 ("EDR") communicative with the processing unit 14 (see FIG. 6). As will be described in detail below, the TTS 12 is used to obtain torque and tension measurements from a top drive system of a drillstring; the processing unit 14 comprises a processor and a memory having stored thereon program code for execution by the processor of a surface stick-slip algorithm that calculates stick-slip of the drillstring from torque measurements taken by the TTS 12; and the EDR 16 is used to display the torque measurements and stick-slip readings to a driller and to store this data for post-processing.

Figure 2:
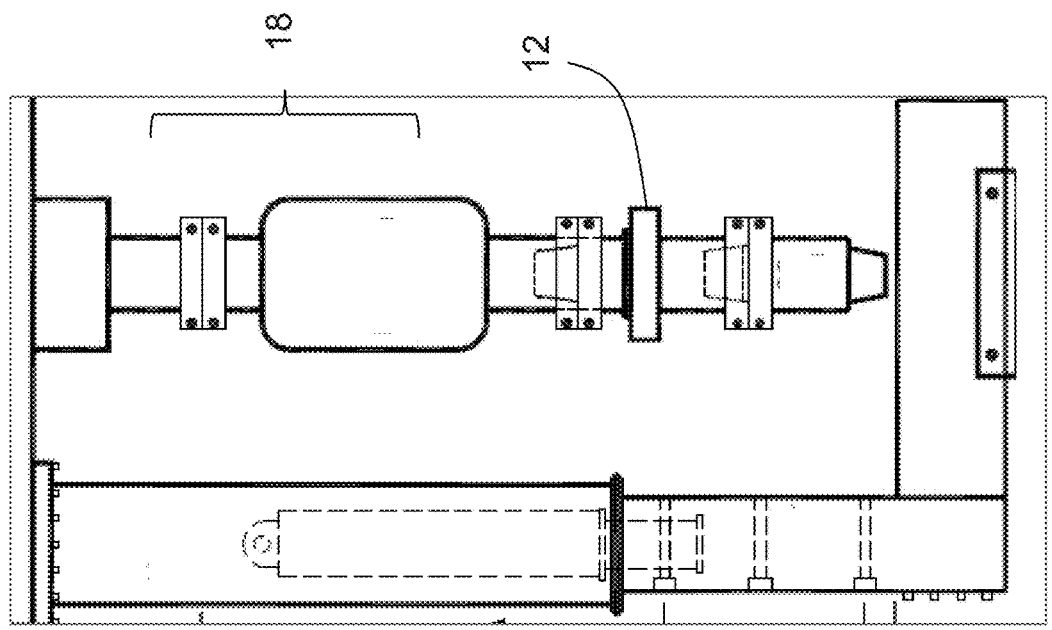
FIG. 2 is a diagram of the torque and tension sub mounted to a top drive system of a drillstring.

As can be seen in FIG. 2, The TTS 12 is mounted to a top drive system 18 directly below a mud-saver valve. The TTS 12 can be a commercially-available torque and tension sub that is capable of performing accurate measurements of surface torque and tension of the top drive motor system 18. For example, one suitable TTS 12 is capable of measuring torque and tension at a 50 Hz rate and to transmit these readings to the processing unit 14 using a wireless link.

The TTS 12 comprises a main body that has a stainless steel core 22 on which several strain gauge sensors 24 are mounted. These sensors 24 measure mechanical strain in tangential and axial axes, and these measurements are used to calculate the magnitude of rotational torque and axial force being applied to the TTS 12. A circular housing 26 surrounds the middle of the core 22 and houses data acquisition electronics including sampling circuits, radio transceivers, and replaceable batteries (not shown). The TTS 12 contains two redundant sets of electronics, i.e. sensors, radios, and batteries, which are used to increase system reliability and prolong effective battery life. In the event of failure, measurement activity can be switched from one set of electronics to the other such that drilling operations can continue. If no failure occurs, the two batteries can be used in sequence to extend the operational time of the unit. Data is transmitted using two omni-directional antennas 15 that are directed downwards towards a remote antenna radio module 30 (see FIG. 6), which can be placed inside a doghouse of a drilling rig, or on the rig floor; the antenna radio module 30 in turn is communicative with the processing unit 14. A wireless link can be implemented in a manner known in the art, e.g. using Zigbee-IEEE 802.15.4.

Figure 3:
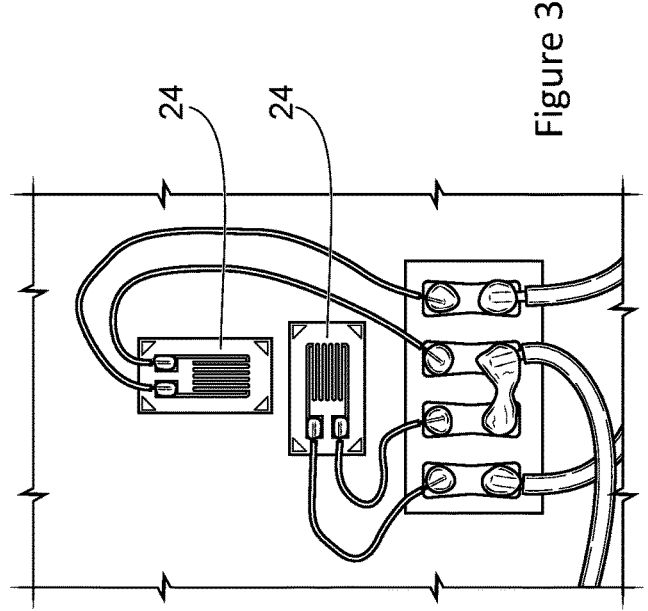
FIG. 3 is a detail view of two strain gauge sensors of the torque and tension sub.
Figure 4:
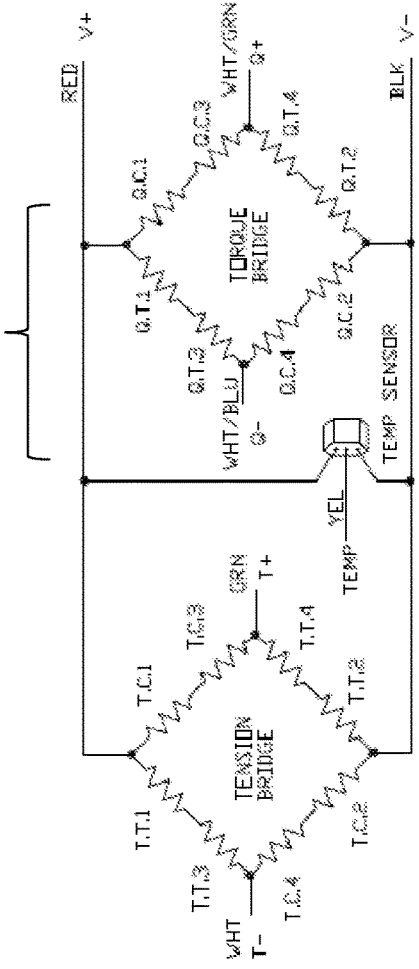
FIG. 4 is a Wheatstone bridge detection circuit of the torque and tension sub.

Referring now to FIGS. 3 and 4, the TTS 12 measures torque and tension using a network of strain gauge sensors 24. The strain gauge sensors 24 are distributed around the circumference of the core 22, and there are two redundant networks for increased reliability. The strain gauge sensors 24 are mounted directly on the core 22, and are surrounded by the housing 26. The data acquisition electronics include a Wheatstone bridge 32 that is used to measure strain gauge resistivity and is configured in such a way that off-axis load errors are minimized. Strain readings are resolved into two voltage signals representing torque and tension which are sampled with analog-to-digital converters (not shown). The TTS 12 includes a microprocessor (not shown) which controls the data acquisition circuitry and performs real-time processing of the raw sensor data to account for temperature variations and unit-specific calibration.

Figure 5:
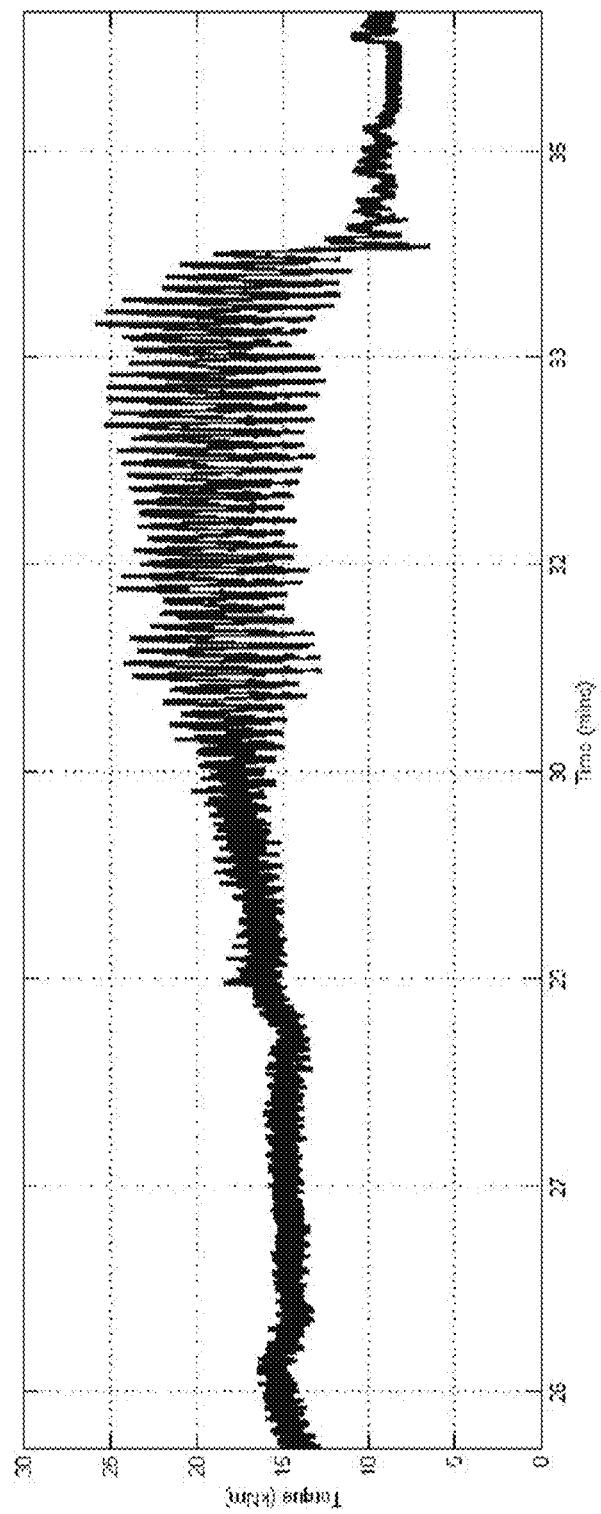
FIG. 5 is a graph of torque applied by the top drive system on the drill string over time, wherein the graph shows a slip-stick event.
Figure 9:
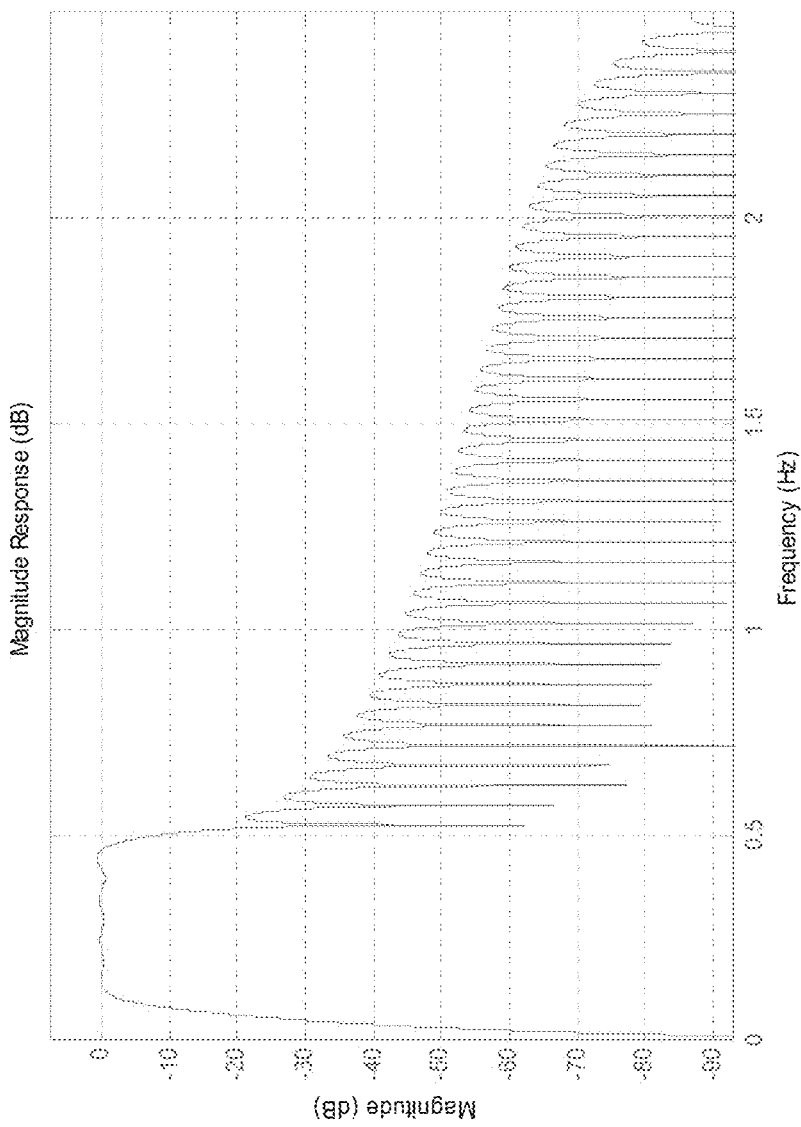
FIG. 9 is a frequency response graph of a bandpass filter used in the method of calculating surface stick-slip indices.

As can be seen in FIG. 5, the torque measurements taken by TTS 12 over time reveal a stick-slip event at around 30-34 seconds. The torque can be sampled at a selected frequency, e.g. 50 Hz, and in such case, the frequencies between 0 Hz and 25 Hz are visible according to Nyquist theory. The torque spectrum contains features throughout the frequency range which are related to high order vibration modes of the drillstring.

Referring now to FIG. 6(*a*), the TTS 12 transmits the torque measurements via antennas 15 to the remote antenna module 30 at a specified sampling rate, e.g. 5 samples per second, which in turn transmits the torque measurements to the processing unit 14. The processing unit 14 contains program code which includes a SSSI algorithm which calculates the stick-slip of the drillstring based on the torque measurements from the TTS 12. The SSSI output is then displayed on a trace viewer display of the EDR 16.

The SSSI algorithm is a calculated metric based on the surface-torque signal which indicates the level of torsional vibration (i.e. stick-slip) that is occurring downhole. The SSSI is defined as:

$$SSSI = \frac{\max(\text{Torque}) - \min(\text{Torque})}{2 \cdot \text{avg}(\text{Torque})} \quad \text{(equation 2)}$$

wherein Torque is obtained from the TTS torque measurement data, and the average torque in the denominator is multiplied by 2 to normalize the SSSI output value.

According to an alternative embodiment and referring to FIG. 6(*b*), the torque measurement data can be obtained/derived by means other than the TTS 12, such as from electrical current measurements from a current sensor (not shown) that measures current to an electric motor of the top drive motor system 18, or from pressure measurements from a hydraulic pressure sensor (not shown) that measures the pressure in a hydraulic line of the top drive motor system 18. In such an embodiment, the electrical current or hydraulic pressure is proportional to the magnitude of the top drive motor torque, and thus the value for Torque in equation 2 can be derived in a manner that is known in the art. Devices that measure top drive motor electrical current and convert this current measurement to a torque measurement (or uses another processor to do the conversion) is known in the art, and include a Pason™ Electric Torque Sensor. Similarly, devices which measure hydraulic line pressure and convert this pressure measurement into a torque measurement (or uses another processor to do the conversion) is known in the art, and include a Pason™ Hydraulic Torque Sensor.

A torque measurement signal output by a suitable current or pressures sensor is input into a universal junction box (UJB) 17 at a specified sampling rate, e.g. 50 samples per second. In the UJB, a series of anti-alias filters of different frequencies are applied to the input signal to avoid or at least reduce spectral aliasing when the signal sample rate is reduced, which in this embodiment comprise an analog filter at 100 Hz, a field programmable gate array (FPGA) at 15 Hz and a micro filter at Hz. The filtered torque measurement signal is then input into the processing unit 14 wherein the SSSI is determined, and an SSSI output is transmitted to the EDR 16 for display in the trace viewer in the same manner as discussed above in relation to FIG. 6(*a*).

Referring now to FIG. 7(*a*), the SSSI algorithm is implemented as SSSI program code in the processing unit 14. To calculate the numerator, a Bandpass Filter step 36 is first applied to remove a constant offset and to restrict the frequencies within the torque signal to the expected range of frequencies of stick-slip vibration (typically 0.1 to 0.5 Hz) for the subject drillstring. A suitable bandpass filter can be an infinite impulse response ("IIR") filter such as the one shown in FIG. 9. This filter can also be a finite impulse response filter ("FIR"). The filter's frequency should be wide enough to include the fundamental vibration mode for stick-slip (resonant frequency) of the drillstring, but should also reject noise and unrelated spectral components in the torque signal. The resonant frequency of a drillstring is a function of certain properties of the drillstring, including its length, strength of material used in the drillstring, and the diameter and thickness of the drill pipe used in the drillstring. The resonant frequencies of various types of drillstrings can be determined from publicly available sources, such as Dufeyte, M-P., and Henneuse, H. 1991. *Detection and Monitoring of the Stick-Slip Motion: Field Experiments*. Paper SPE 21945 presented at the SPE/IADC Drilling Conference, Amsterdam, March 11-14.

An Envelope Detector step 38 is then applied within a sliding time window of a selected time period (e.g. 40 seconds) wherein the minimum torque value within the time window is subtracted from the maximum torque value within the time window. To calculate the denominator, a Delay step 40 is applied to synchronize the signal with the Bandpass Filter output (wherein an amount of time delay is selected to correspond to the time taken to perform the Bandpass Filter step), and a Calculate Mean step 42 is applied to calculate the average torque over the selected sliding time window, and a Normalizing step 41 is applied to normalize the denominator (by multiplying the average torque signal by 2). The numerator is then divided by the normalized denominator to produce a raw SSSI value 46 which can be subjected to post-processing before being sent to the EDR 16 for display.

While the steps described in FIG. 7(*a*) are implemented by program code, some of these steps can be implemented by hardware equivalents; for example a hardware bandpass filter can perform step 36 by directly filtering an analog signal from a torque sensor (instead of using the UJB 17).

In an alternative embodiment and referring to FIG. 7(b), the Bandpass Filter 36 has an adjustable frequency response based on the known length of the drillstring. The EDR 16 normally contains information about the length of drillstring in the form of a Bit Depth 48 parameter. The Bit Depth 48 parameter can be used to estimate a narrow range of frequencies at which stick-slip oscillation will likely occur. This frequency range corresponds to the expected resonant frequencies for various types of drillstrings of known length. In this alternative embodiment, the BandPass Filter frequency response is dynamically adjusted in real-time according the current value of Bit Depth 48. In general, smaller Bit Depths will translate to a higher frequency range (i.e. higher resonant frequency), and larger Bit Depths will translate to a lower frequency range (i.e. lower resonant frequency).

Referring now to FIG. 8, the post processing includes a blanking operation wherein the processing unit 14 includes SSSI Blanking program code that is executed to prevent the display of misleading information to the driller. The SSSI Blanking program code is based on the understanding that the SSSI program code only provides a meaningful measurement of stick-slip when the applied torque is relatively constant. In particular, stick-slip may not be detected by the SSSI program code if there are large torque fluctuations due to abrupt changes in drillstring rotary speed. The stick-slip measurement may also be inaccurate if drillstring rotary speed is low and falls within the frequency range of the bandpass filter.

To prevent the display of misleading information to the driller, the SSSI Blanking program code when executed will set the SSSI to null under certain conditions. When the Blanking program code is executed, a Value Limiter step 50 is applied to limit the raw SSSI value 46 to between 0 and 1 to prevent large values when the torque signal is low (SSSI values outside this range returns a null value). The SSSI value will also be set to null when any of the following blanking conditions are met:
- average measured torque over a selected previous time window (e.g. 40 seconds) has varied by more than a preset threshold DeltaTh (e.g. 10%) (step 52); the average measured torque is determined by a Max-Min Detector program module in the processing unit 14, wherein this module measures the change in average torque, i.e. Max (average torque)—Min (average torque)
- drillstring rotary speed RPM is less than a defined low speed threshold (e.g. 40 RPM) (step 54)
- the bit is off-bottom (i.e. not drilling) (step 56)
- the drillstring is in-slips (i.e. not drilling) (step 58)

Figure 10:
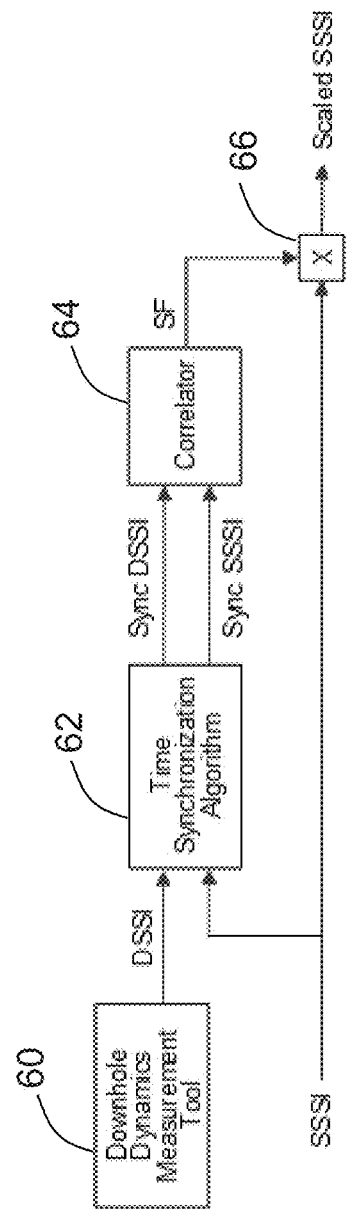
FIG. 10 is a method for determining an appropriate value for a scaling factor for a surface stick-slip index, according to another embodiment.

According to an alternative embodiment, and in applications where a downhole dynamics measurement tool (or downhole RPM sensor) is present, the system can be further enhanced by deriving an appropriate scaling factor for the SSSI metric. Prior art, such as PCT publications WO 2011/017626 and WO 2011/017627, suggests that the peak-to-peak swings in surface torque are related to peak-to-peak swings in downhole RPM by a relatively constant scaling factor. When periodic measurements from a downhole tool are available, a method as shown in FIG. 10 can be used to determine the appropriate value for the scaling factor in real-time (i.e. during drilling operations). Referring to FIG. 10, a downhole tool performs a downhole stick-slip measurement to obtain a downhole stick slip index ("DSSI", step 60) and sends it to surface using downhole telemetry methods. As the SSSI and DSSI measurements may undergo different delays due to signal transmission and metric calculation times, both signals are sent to a synchronization algorithm to ensure that they are properly aligned in time (step 62). The synchronized versions of SSSI and DSSI are then sent to a correlator which determines the appropriate scaling factor SF to apply to SSSI (step 64). The appropriate scaling factor is one that makes SSSI as highly correlated to DSSI as possible. Finally, the scaling factor is applied to SSSI using $$\text{Scaled SSSI} = SF \cdot \text{SSSI} \qquad \text{(equation 3)}$$

to obtain the Scaled SSSI which is displayed to the drilling crew (step 66). It should be noted that this method allows a reliable estimate of the downhole stick-slip magnitude using continuous measurement of surface torque and only periodic measurement of downhole RPM. Instead of continuously sending DSSI to the surface, this method allows the downhole tool to conserve on battery life, perform other measurements, or transmit other valuable information over the bandwidth-constrained downhole communication channel.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. A method for detecting stick-slip in a drillstring, comprising:
    applying torque to the drillstring by a top drive system over a selected time period;
    using at least one surface sensor to measure a parameter that is a function of the applied torque, wherein the at least one surface sensor produces measurement data including torque values over a frequency range;
    after measuring the parameter, using a processing unit, comprising a processor and a memory, to apply at least one anti-alias filter to reduce spectral aliasing when a signal sample rate received from the at least one surface sensor is reduced;
    after applying the at least one anti-alias filter, using the processing unit to filter out the measurement data that has a frequency outside a selected frequency band, wherein the selected frequency band includes a resonant frequency of the drillstring;
    using the processing unit to identify a minimum torque value and a maximum torque value in the filtered measurement data, and to determine a difference of these two values;
    using the processing unit to determine a surface stick-slip index by dividing the difference between the maximum torque value and the minimum torque value by an average torque value over the selected time period;
    using the processing unit to normalize the average torque value such that the surface stick-slip index is determined by dividing the difference between the maximum torque value and the minimum torque value by a normalized average torque value; and
    using the processing unit to display the surface stick-slip index on a display,
    wherein the measured parameter comprises electrical current, and wherein the at least one surface sensor comprises a current sensor in electrical communication with an electric motor of the top drive system.

2. A method as claimed in claim 1 wherein the measured parameter comprises strain, and wherein the at least one surface sensor comprises a pair of strain gauge sensors in a torque and tension sub coupled to the top drive system.

3. A method as claimed in claim 1 wherein the measured parameter comprises pressure, and wherein the at least one surface sensor comprises a hydraulic pressure sensor in communication with a hydraulic line of the top drive system.

4. A method as claimed in claim 1 further comprising applying a blanking operation to the determined surface stick-slip index before displaying the stick-slip index, the blanking operation comprising setting the surface stick-slip index to null when a rotary speed of the drillstring is less than a selected low speed threshold, or when an average torque over the selected time window varies more than a selected threshold, or when a bit of the drillstring is off-bottom, or when the bit is in-slips.

5. A method as claimed in claim 1 wherein step (c) further comprises determining a bit depth of the drillstring, and dynamically adjusting the selected frequency band according to the determined bit depth.

6. A method as claimed in claim 1 further comprising applying multiple anti-alias filters of differing frequencies.

7. An apparatus for detecting stick-slip in a drillstring comprising:
a surface sensor in sensory communication with a top drive system and configured to measure a parameter over a selected time period that is a function of torque applied by the top drive system to the drillstring, and to produce measurement data that includes torque values over a frequency range;
at least one anti-alias filter in communication with the at least one surface sensor and configured to reduce spectral aliasing when a signal sample rate received from the surface sensor is reduced;
a bandpass filter configured to filter out the measurement data that has a frequency outside a selected frequency band, wherein the selected frequency band includes a resonant frequency of the drillstring;
a processing unit comprising a processor and a memory having encoded thereon program code that when executed by the processor identifies a minimum torque value and a maximum torque value in the filtered measurement data and determines a difference of these two values; and determines a surface stick-slip index by dividing the difference between the maximum torque value and the minimum torque value by an average torque value over the selected time period; and
(e) a display communicative with the processing unit and configured to display the surface stick-slip index,
wherein the measured parameter comprises electrical current, and wherein the at least one surface sensor comprises a current sensor in electrical communication with an electric motor of the top drive system.

8. An apparatus as claimed in claim 7 wherein the bandpass filter is part of the program code stored on the memory.

9. An apparatus as claimed in claim 7 wherein the measured parameter comprises strain, and wherein the at least one surface sensor comprises a pair of strain gauge sensors in a torque and tension sub coupled to the top drive system.

10. An apparatus as claimed in claim 7 wherein the measured parameter is pressure, and the at least one surface sensor comprises a hydraulic pressure sensor in communication with a hydraulic line of the top drive system.

11. An apparatus as claimed in claim 7 further comprising multiple anti-alias filters of differing frequencies.

12. An apparatus as claimed in claim 7 wherein the memory further comprises program code that when executed by the processor, applies a blanking operation to the determined surface stick-slip index before displaying the stick-slip index, wherein the blanking operation comprises setting the surface stick-slip index to null when a rotary speed of the drillstring is less than a selected low speed threshold, or when an average torque over the selected time window varies more than a selected threshold, or when a bit of the drillstring is off-bottom, or when the bit is in-slips.

13. An apparatus as claimed in claim 7 wherein the memory further comprises program code that when executed by the processor, determines a bit depth of the drillstring, and dynamically adjusts the selected frequency band according to the determined bit depth.

14. A method for detecting stick-slip in a drillstring, comprising:
applying torque to the drillstring by a top drive system over a selected time period;
using at least one surface sensor to measure a parameter that is a function of the applied torque, wherein the at least one surface sensor produces measurement data including torque values over a frequency range;
using a processing unit, comprising a processor and a memory, to filter out the measurement data that has a frequency outside a selected frequency band, wherein the selected frequency band includes a resonant frequency of the drillstring;
using the processing unit to identify a minimum torque value and a maximum torque value in the filtered measurement data, and to determine a difference of these two values;
using the processing unit to determine a surface stick-slip index by dividing the difference between the maximum torque value and the minimum torque value by an average torque value over the selected time period;
using the processing unit to display the surface stick-slip index on a display; and
using the processing unit to (i) determine a downhole stick slip index ("DSSI"), (ii) time-synchronize the DSSI and the surface stick slip index ("SSSI"), (iii) correlate the time-synchronized DSSI with the time-synchronized SSSI to produce a scaling factor, and (iv) scale the SSSI using the scaling factor.

15. A method as claimed in claim 14 wherein determining the DSSI comprises periodically measuring downhole RPM by a downhole tool.

16. An apparatus for detecting stick-slip in a drillstring comprising:
a surface sensor in sensory communication with a top drive system and configured to measure a parameter over a selected time period that is a function of torque applied by the top drive system to the drillstring, and to produce measurement data that includes torque values over a frequency range;
a bandpass filter configured to filter out the measurement data that has a frequency outside a selected frequency band, wherein the selected frequency band includes a resonant frequency of the drillstring;
a processing unit comprising a processor and a memory having encoded thereon program code that, when executed by the processor: (i) identifies a minimum torque value and a maximum torque value in the filtered measurement data and determines a difference between these two values; (ii) determines a surface stick-slip index by dividing the difference of the maximum torque value and the minimum torque value by an average torque value over the selected time period; (iii) determines a downhole stick slip index ("DSSI"); (iv) time-synchronizes the DSSI and the surface stick slip index ("SSSI"); (v) correlates the time-synchronized DSSI with the time-synchronized SSSI to produce a scaling factor; and (vi) scales the SSSI using the scaling factor; and a display communicative with the processing unit and configured to display the surface stick-slip index.

* * * * *